June 12, 1962     C. A. PARSKE ETAL     3,038,386

POWER OPERATED TOOL DRAW-IN BAR

Filed April 23, 1958     2 Sheets-Sheet 1

INVENTORS
Charles A. Parske
BY Stephen F. Kulpa
Emery J. Wutschel
Attorney

June 12, 1962  C. A. PARSKE ETAL  3,038,386
POWER OPERATED TOOL DRAW-IN BAR
Filed April 23, 1958  2 Sheets-Sheet 2

INVENTORS
Charles A. Parske
BY Stephen F. Kulpa
Elroy J. Wutschel
Attorney

United States Patent Office 3,038,386
Patented June 12, 1962

3,038,386
POWER OPERATED TOOL DRAW-IN BAR
Charles A. Parske and Stephen F. Kulpa, Milwaukee, Wis., assignors to Kearney & Trecker Corporation, West Allis, Wis., a corporation of Wisconsin
Filed Apr. 23, 1958, Ser. No. 730,416
10 Claims. (Cl. 90—11)

This invention relates to an improvement in power draw-in bar mechanisms for engaging or disengaging a tool element such as a tool holder, arbor, tool chuck, or the like to or from a tool receiving spindle. The attachment of a heavy tool such as a cutter to a milling machine spindle may be a difficult operation and often requires the services of two men. One holds the cutter in position in the spindle while the other tightens a nut on an elongated draw-in bar that extends through the spindle into threaded engagement with the tool holder. The release of the tool is attended with even greater difficulties in that the tool must be freed from the tight fit within the tapered socket of the spindle before release of the tool can be accomplished. While other power draw-in bar mechanisms are known, most of these are complicated, expensive, cumbersome and are frequently unreliable.

Thus, a primary object of the present invention is to provide a power draw-in bar arrangement that serves to facilitate the attachment of a cutting tool to a machine tool spindle and to release the tool from the spindle and which is operable by the machine operator without climbing upon the machine or necessitating his moving about the machine while changing tools.

Another object of the present invention is to provide a power draw-in bar mechanism which may be readily adapted to existing machine tools.

A further object of the present invention is to provide a power draw-in bar mechanism which has a spindle lock arrangement which is operable to prevent rotation of the spindle upon a tool engaging or releasing operation.

A still further object of the present invention is to provide a power draw-in bar mechanism which is selectively operable to accomplish tool engagement or tool release.

Another object of the present invention is to provide an improved power draw-in bar mechanism that is positive in operation, that is relatively simple in construction, and that is relatively inexpensive to manufacture.

Other objects and advantages of the invention will become apparent from the following detailed description taken in conjunction with the accompanying drawing, in which:

FIG. 4 is a schematic representation of an electrical control circuit for controlling the spindle and draw-in bar.

For the purpose of illustrating the invention the power draw-in bar mechanism is shown embodied in a machine tool of the type commonly known as a horizontal milling machine. It is to be understood, however, that the power draw-in bar mechanism may be used in other types of machine tools which may require the power draw-in bar mechanism to be disposed in a vertical plane; or the invention may be employed in other applications wherever it is desired to effect automatic engagement and disengagement of associated members.

Figure 1:
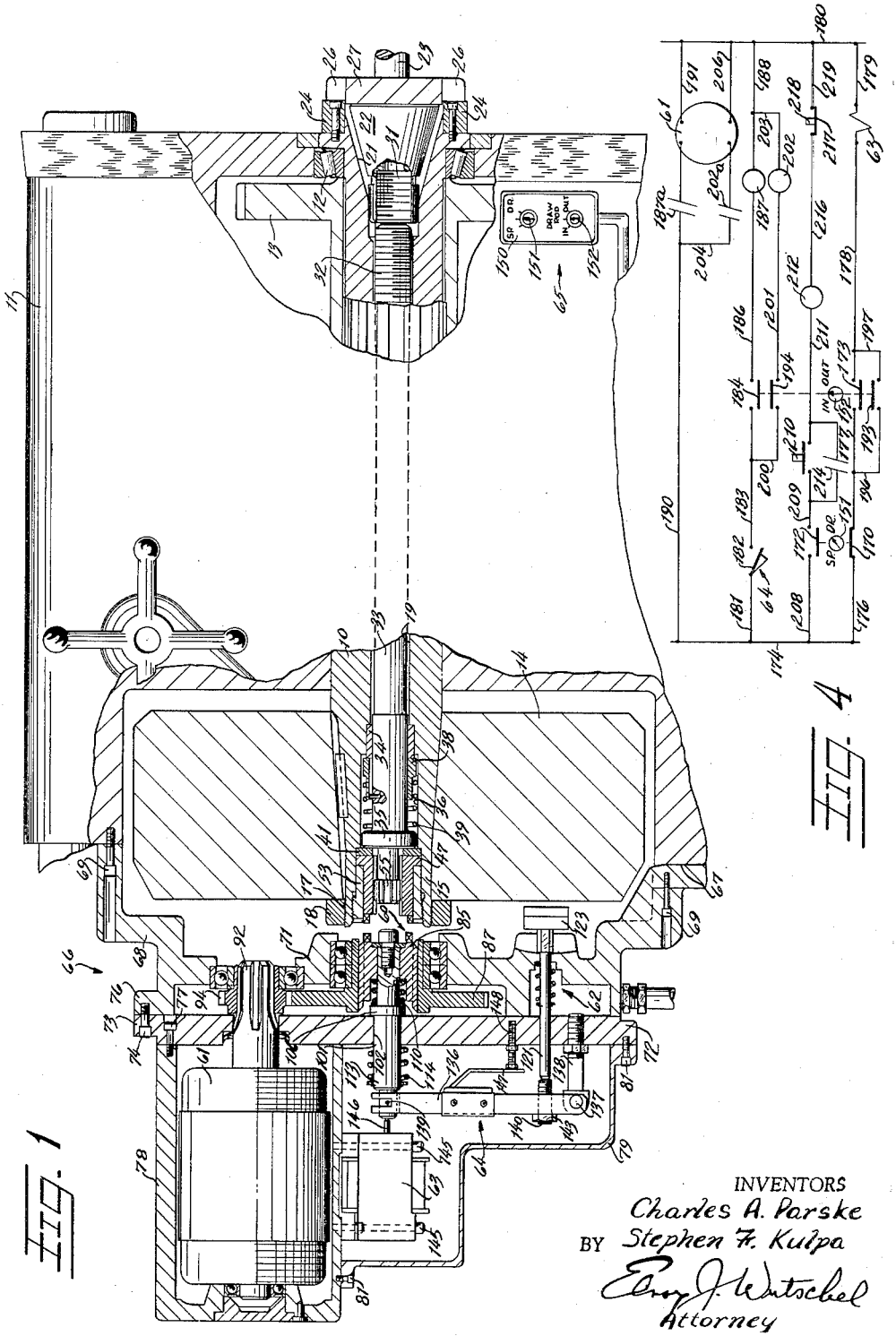
FIGURE 1 is a view partly in vertical section and partly in side elevation depicting the upper portion of the column of a horizontal milling machine which incorporates the improved power draw-in bar mechanism of the present invention and showing the position of the various operating parts of the power draw-in bar mechanism prior to a tool engaging operation.

As shown in FIG. 1, the invention has been illustrated in conjunction with a horizontally disposed spindle 10 of a horizontal milling machine. The spindle 10 is supported in an upstanding column 11 and is rotatably supported therein by a plurality of antifriction bearings 12, one of which is shown. The spindle 10 is operably connected to be driven by a motor (not shown) housed within the lower portion of the column 11 and connected to a spindle drive gear 13 by the usual gear transmission (not shown), in a well known manner. The spindle 10 is provided with a flywheel 14 which is mounted on the rearward end 15 of the spindle 10 and keyed thereto so as to rotate with it. The extreme rearward end of the spindle 10 is provided with an external threaded portion 17 which receives a threaded locking nut 18 that functions to maintain the flywheel 14 on the spindle.

The spindle 10 comprises an elongated generally cylindrical body having an axial bore 19. At the forward or outer end of the spindle the bore 19 is flared to define a conical socket 21 for receiving the tapered shank 22 of a tool holder 23 which supports conventional cutting tools in a well known manner. Concentrically arranged with the socket 21 are axially extending keys or lugs 24 which are formed to fit into slots 26 formed in a collar 27 on the tool holder 23. The keys 24 cooperate with the slots 26 to constitute the driving connection between the spindle 10 and the tool holder 23 when the tool is seated within the socket 21. The arrangement is such that when the tool holder 23 is seated within the socket 21, the collar 27 will be spaced from the outer axial face of the spindle to insure a complete and tight fit of the tapered shank portion 22 of the tool holder with the socket 21. The shank portion 22 of the tool holder 23 is provided with an axial threaded opening 31 which receives the threaded end 32 of a draw-in bar 33.

Figures 2, 3:
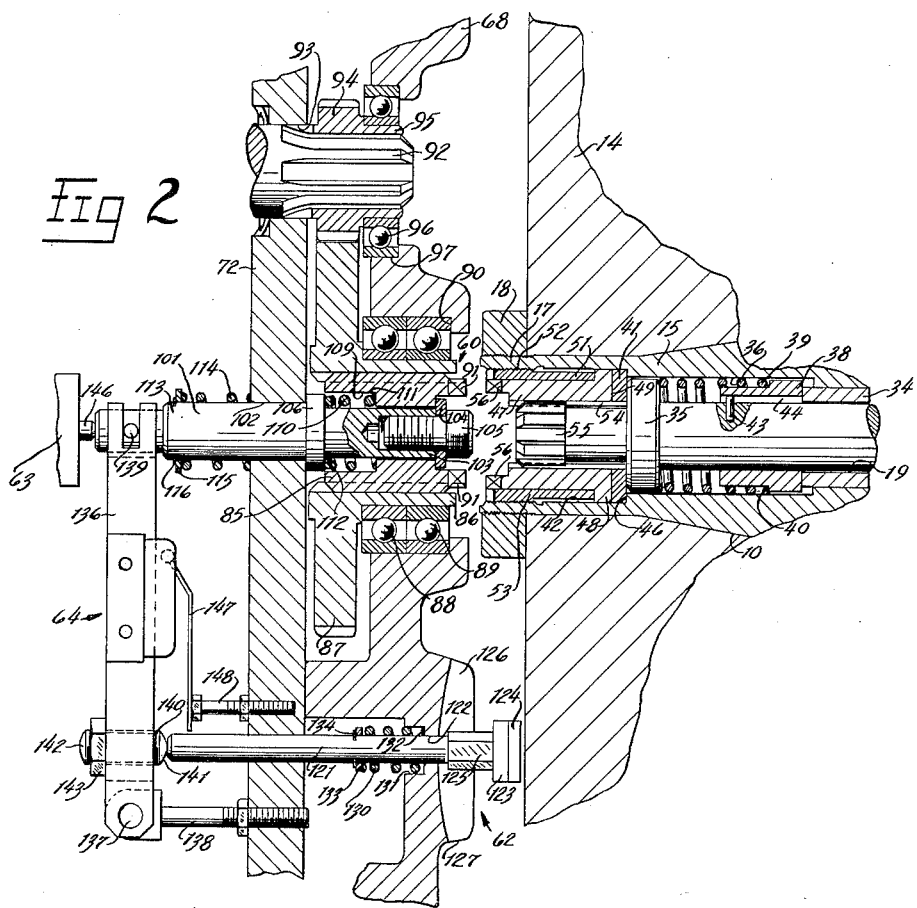
FIG. 2 is an enlarged fragmentary view similar to FIG. 1, showing the clutch, brake and operating lever in greater detail.
FIG. 3 is a fragmentary view of the spindle of the machine substantially in vertical section taken along its longitudinal axis to show the relationship of the parts therein when the tool has been engaged in the spindle.

The draw-in bar 33, as shown in FIGS. 1 and 2, is an elongated shaft extending lengthwise in the bore 19 of the spindle 10. The draw-in bar is rotatably supported within the bore 19 of the spindle, with its axis coinciding with the axis of the bore, in forwardly and rearwardly located bushings, the rearward bushing 34 being shown. As previously mentioned the extreme forward end of the draw-in bar 33 is threaded as at 32 to be threadedly received in the threaded opening 31 of the tool holder 23. While the preferred means of connecting the draw-in bar and the tool holder is shown, any other suitable means may be used for this purpose, wherein a connection may be established upon rotation of the draw-in bar.

At its rear end the draw-in bar 33 is formed with a collar 35 disposed within an enlarged portion 36 of the bore 19. A suitable sleeve 38 is disposed between the collar 35 and the end of the bushing 34. As shown in FIG. 2, a spring 39 acting between the collar 35 and a shoulder 40 provided on the sleeve 38 normally urges the draw-in bar 33 rearwardly so that the collar 35 abuts a thrust bearing 41. The spring 39 is of sufficient length so that when the draw-in bar 33 is in its normal rearward position the spring will continue to exert a force upon the draw-in bar insuring that it will be positively maintained in the normal retracted position.

To prevent the spring 39 from coiling when the draw-in bar 33 is rotated in either direction, a pin 43 is provided in the draw-in bar 33 and projects radially outwardly thereof into a longitudinal keyway 44 provided in the sleeve 38. The sleeve 38 will therefore be rotated with the draw-in bar 33 and since the spring 39 is maintained between the collar 35 and the shoulder 40 of the sleeve 38 under a slight compression, the spring will also rotate with the draw-in bar. Thus, the draw-in bar is normally maintained in the retracted position, as shown in FIG. 1. With the draw-in bar 33 in its normal position the tool 23 may be manually inserted within the socket 21 of the spindle 10 and the tool oriented so that the slots 26 in the collar 27 will be positioned to receive the keys or lugs 24. In this position the inner end of the tool holder 23 will abut the threaded end 32 of the draw-in bar 33 thereby being conditioned for power operation of the draw-in bar 33.

The thrust bearing 41 is disposed within another enlarged portion 42 of the bore 19 in a manner to seat against a shoulder 46 formed by the opening 36 and the opening 42. Within the enlarged bore opening 42 there is provided an elongated tubular clutch element 47 the body of which is of a lesser diameter than the diameter of the bore opening 42. The clutch element 47 is provided at its inner end with an annular flange 48 which fits within the bore 42. The axial face 49 of the annular flange 48 abuts the thrust bearing 41 to maintain the thrust bearing in place against the shoulder 46. The spindle 10 is provided at its inner end with an internal threaded portion 52 which threadedly receives a locking sleeve 53 that acts as a sleeve bearing for the clutch element 47 and fits between the bore 42 and the body of the tubular clutch element 47. The locking sleeve 53 is threadedly engaged sufficiently far so that its inner end 51 will abut the annular flange portion 48 of the clutch element 47 to effectively lock the clutch element 47 and the thrust bearing 41 in the bore. Thus, both the clutch element 47 and the thrust bearing 41 are securely locked in position in the bore 42 with the clutch element 47 being free to rotate therein.

The axial bore of the clutch element 47 is provided with splines 54 which are complementary to and in operative engagement with a splined driving head 55 provided on the draw-in bar 33. Thus, with the arrangement described, the draw-in bar 33 has a limited range of axial movement as established by the space existing between the thrust bearing 41 and the end of the sleeve 38. Within this range of movement the driving connection between the clutch element 47 and the splined head 55 of the draw-in bar 33 will be maintained due to the sliding arrangement of the splined head 55 within the clutch element 47.

The clutch element 47 is provided with a plurality of axially extending teeth 56, which may be two in number, spaced diametrically opposite to each other. The teeth 56 on the clutch element 47 provide the means through which the driven clutch element 47 may be rotated in either direction of rotation to rotate the draw-in bar 33 in either direction.

The power draw-in bar arrangement of this invention, comprises in general, a driving clutch member, generally identified by the reference numeral 60, a reversible electric motor 61, a spindle locking mechanism or brake mechanism, for preventing rotation of the spindle 11 during tool engagement or disengagement, and generally identified by the reference numeral 62, a solenoid 63 for engaging the driving clutch element 60 with the driven clutch element 47 and also for actuating the locking mechanism 62, a switch 64 for energizing the motor 61, and a control box for operating the power draw-in bar mechanism in a selected direction of operation and generally indicated by the reference numeral 65. The entire power draw-in bar mechanism is contained in a frame 66 which is adapted to be detachably secured to the rear face 67 of the column 11.

The frame 66 comprises a base casting 68, which is adapted to be removably secured to the rear face 67 of the column 11 as by bolts 69, and has a partition 71. A plate or end casting 72 having a plurality of lugs, such as at 73, is removably secured to the end of the base casting 68 by means of threaded screws 74 which threadedly engage mating lugs 76 provided on the base casting 68. The motor 61 is carried in a housing 78 which is detachably secured to the end plate 72 as by screws 77 which extend through the end plate 72 into threaded engagement with the motor housing 78. A cover 79 is secured by screws 81 to the motor housing 78 as well as to the end plate 72 for the purpose of completely enclosing the various operating parts of the power draw-in mechanism.

The driving clutch element 60 comprises a sleeve 85 slidably mounted within an elongated hub portion 86 of a driving gear 87 disposed in axial alignment with the clutch element 47. The driving gear 87 is rotatably supported in operating position by means of its elongated hub portion 86 being journalled in a pair of antifriction bearings 88 and 89. The antifriction bearings are mounted in a recess 90 formed in the partition 71 of the base casting 68. The clutch sleeve 85 is mounted within the hub portion 86 through a splined connection to permit axial movement of the sleeve within the hub but which prevents relative rotational movement of the sleeve with respect to the gear 87. The sleeve 85, on its inner end or the end adjacent to the driven clutch element 47, is provided with a plurality of axially extending teeth 91 which may be engaged with the teeth 56 on the clutch element 47.

A driving connection from the electric motor 61 to the driving gear 87 is established from a drive shaft 92 of the electric motor 61. To this end the drive shaft 92 extends through a suitable opening 93 provided in the end plate 72. A pinion 94 is mounted on the end of the shaft 92 through a splined connection so as to secure the gear to the shaft for rotation with it. The pinion 94 is provided with an elongated hub 95 which is journalled in an antifriction bearing 96. The bearing 96 is mounted in a suitable recess 97 provided in the partition 71 of the base casting 68. The arrangement, as shown in FIG. 1, is such, that both the pinion 94 and the shaft 92 of the electric motor 61 are rotatably supported by the antifriction bearing 96. The pinion 94 is arranged so that it is in constant meshed engagement with the driving gear 87. Thus, rotational drive in either direction of rotation is established to the driving clutch sleeve 85 through the shaft 92, the pinion gear 94, and the driving gear 87.

Movement of the driving clutch sleeve 85 axially into engagement with the clutch element 47 is accomplished through an actuating shaft 101. The shaft 101 is slidably supported in an opening 102 provided in the end plate 72 and is disposed in axial alignment with the clutch sleeve 85. The inner end 103 of the shaft 101 extends through the clutch sleeve 85 and is coupled to the sleeve by means of a retainer 104. The retainer 104 is seated in a suitable recess provided in the axial end face of the sleeve 85 and is maintained in place by means of a screw 105 that is threadedly engaged into the end of the shaft 101. The shaft 101 is provided with a collar 106 which bears against the inner surface of the end plate 72 to limit the rearwardly travel of the shaft 101. The clutch sleeve 85 is provided with an enlarged bore or recess 109 at its end adjacent to the end plate 72 for receiving a spring 110 mounted on the shaft 101. One end of the spring 110 seats against a shoulder 111 of the sleeve 85 and has its opposite end bearing against a slip washer 112 which is mounted on the shaft 101 and disposed in bearing engagement with the collar 106 of the shaft 101. Thus, when the driving clutch sleeve 85 is rotated, the spring 110 may rotate with it and the slip washer 112 will function to prevent coiling of the spring 110 by slipping over the face of the collar 106. The spring 110 is of a length so that when the shaft 101 and the clutch sleeve 85 are in their normal position, as shown in FIGS. 1 and 2, the spring 110 is partially compressed. It is therefore apparent that the shaft 101, the spring 110 and the sleeve 85 will move axially rightwardly as a unit whenever a force is applied to the end 113 of the shaft 101.

The outer or rearwardly extending end 113 of the shaft 101 is provided with a spring 114, one end of which abuts against the outer face of the end plate 72 and the opposite end of which abuts a retaining ring 115. The retaining ring 115 is maintained in position on the shaft by a snap ring 116. The spring 114 when in position on the shaft 101, exerts a force against the retaining ring 115 to maintain the shaft 101 in its rearward axial position with the collar 106 abutting the inner surface of the end plate 72. The spring 114 therefore operates to continuously but yieldably urge the shaft 101 to its rearmost position. Thus, a positive force may be applied to the outer end 113 of the shaft 101 to overcome the pressure exerted by the spring 114 and move the shaft inwardly towards the spindle 10. As the shaft 101 moves inwardly, the collar 106 will act upon the spring 110 which, in turn, will exert an axial force upon the clutch sleeve 85 through the shoulder 111, moving the clutch sleeve 85 into engagement with the driven clutch element 47. However, should the condition be such that the teeth 56 on the driven clutch element 47 are disposed in alignment with the teeth 91 on the driving clutch sleeve 85 so that these elements will abut each other to prevent driving engagement, the spring 110 will be compressed allowing the shaft 101 to be moved its full distance of travel. With this condition existing, the driving clutch sleeve 85 will be spring loaded and upon initial energization of the electric motor 61 the sleeve 85 will be rotated to permit the teeth 91 of the sleeve 85 to move into clutching engagement with the teeth of the driving clutch element 47. This action will occur by reason of the combined frictional forces that exist between the clutch element 47 and the locking sleeve 53, and between the face 49 of the annular flange 48 and the thrust bearing 41, and the engaging faces of the thrust bearing 41 and the collar 35, which act to maintain the clutch element 47 stationary when the motor 61 operates to rotate the driving clutch sleeve 85. When the actuating force that is applied to the end of the shaft 101, to move it inwardly is removed, the compressed spring 114 will cause the shaft 101 to move outwardly to its normal position. As the shaft 101 returns to its normal position the retainer 104 screw fastened to the end of the shaft will cause the driving clutch sleeve 85 to move with the shaft 101 and out of engagement with the driven clutch element 47. In this manner the rotative driving connection from the motor 61 to the draw-in bar 33 is interrupted either after tool engagement or tool disengagement.

As previously mentioned, the spindle 10 is prevented from rotating during a tool engaging operation or a tool disengaging operation. To this end, the spindle locking or braking mechanism 62 is disposed so as to be movable into holding engagement with a member that is secured to the spindle. In the particular machine tool spindle illustrated, the spindle at its rearward end has a flywheel 14 secured to it and advantage has been taken of the proximity of the flywheel 14 to the power draw-in mechanism. However, while the particular spindle construction shown has a flywheel which is located in desired relationship to the power draw-in mechanism, a special disc or other elements could be secured to the spindle for the purpose of effecting the locking action.

As shown in FIGS. 1 and 2, the spindle locking mechanism 62 comprises a shaft 121 which is slidably supported in a suitable opening in the end plate 72. The shaft 121 extends inwardly into and through an opening 122 provided in the partition 71 of the base plate 68. The forward end of the shaft 121 is formed as a disc or plate 123 to which is secured a compressible friction material 124. The portion 125 of the shaft 121 immediately behind the disc 123, is hexagonal in form and slidably fits within a slot 126 formed in a boss 127. With this arrangement, the shaft 121 is free to move axially but is prevented from rotating. To maintain the shaft 121 in its normal disengaged position, as shown in FIGS. 1 and 2, a spring 130 is mounted on the shaft, one end of which extends within an enlarged bore 131 and seats against a shoulder 132 formed by the bore 131 and the opening 122. The opposite end of the spring abuts a retaining ring 133 mounted on the shaft 121 and maintained in position by a snap ring 134. The spring 130 is of sufficient length so that when the shaft 121 is in its normal retracted position, the spring is still operative to exert a slight force against the retaining ring 133, thereby insuring positive retention of the shaft 121 in its normal retracted position.

To actuate the shaft 121 axially into a locking position wherein the friction material 124 is in engagement with the flywheel 14, a lever mechanism is provided. As shown in FIGS. 1 and 2, the lever mechanism comprises a lever arm 136 having one end pivotally connected by means of a pin 137 to an extending bolt 138 threadedly engaged in the end plate 72. The opposite or upper end of the lever arm 136 is pivotally connected by a pin 139 to the clutch sleeve actuating shaft 101. A threaded stud 140 is threadedly engaged in the lever arm 136 and has one end 141 abutting the end of the shaft 121. The opposite end 142 of the stud 140 extends outwardly of the lever arm and has a lock nut 143 threadedly engaged thereon. Thus, a force applied to the end of the clutch sleeve actuating shaft 101 to move it axially, will effect simultaneous movement of the upper end of the lever 136 connected to the shaft 101. Since the lower end of the lever 136 is pivotally connected to the extending bolt 138, movement of the upper end of the lever will be immediately reflected in a proportional movement in the lower end of the lever 136 thereby moving the stud 140. With the stud 140 in engagement with the end of the shaft 121 the movement of the upper end of the lever 136 will be immediately transmitted to the shaft 121 to move it axially inwardly. The arrangement of the lock mechanism 62 is such, that when it is in a normal retracted position the face of brake pad 124 is spaced a slight distance from the face of the flywheel 14 which distance is substantially less than the distance between the facing ends of the teeth 56 of the clutch element 47 and the teeth 91 of the sleeve 85. It is therefore apparent, that as the shaft 101 is moved inwardly toward the draw-in bar 33, the lever arm 136 will move with it and the stud 140 moving with the arm 136 will move the shaft 121 to engage the friction pad 124 tightly against the flywheel 14 to lock the spindle 10 against rotation. Since the normal distance between the pad 124 and the flywheel 14 is substantially less than the distance between the end faces of the teeth 56 and 91, the locking mechanism will have effectively locked the spindle against rotation before the axial faces of the teeth 91 have been moved into the plane in which the axial faces of the teeth 56 are disposed. As the drive clutch sleeve actuating shaft 101 continues to be moved rightwardly, as viewed in FIG. 2, the force exerted on the end of the brake shaft 121 by the stud 140 will act to compress the brake pad 124 to permit the shaft 101 and lever 136 to move through their complete distances of travel while effectively braking the flywheel 14 and thereby the spindle 10.

A solenoid 63 is employed for the purpose of applying a force against the end of the clutch sleeve actuating shaft 101. The solenoid 63 is secured by screws 145, to the underside of the housing 78 of the electric motor 61. The solenoid 63 is disposed so that a movable plunger 146 thereof is in axial alignment with the shaft 101. The arrangement is such that the axial end of the plunger 146 will be in contact with the end of the shaft 101 when the solenoid is de-energized. The length of stroke of the plunger 146, upon energization of the solenoid 63, is such that it will move the actuating shaft 101 a distance sufficient to effect a complete clutching engagement between the teeth 56 of the clutch element 47 and the teeth 91 of the sleeve 85.

Upon energization of the solenoid 63 the plunger 146 will always move the complete length of its stroke, even though the axial faces of the teeth 91 of the sleeve 85 and the axial faces of the teeth 56 of the clutch element 47 engage. This is possible through the arrangement of the spring 110 which effects movement of the sleeve 85 axially upon movement of the shaft 101.

Thus, assuming that the clutch element 47 and the sleeve 85 are so disposed that their teeth are in alignment with respect to each other, the solenoid 63 will be energized to forcefully extend the plunger 146 outwardly thereof to move the shaft 101 axially rightwardly. The spring 110 will thereupon enforce movement of the sleeve 85 until the faces of the teeth 91 thereof engage against the faces of the teeth 56. Thereupon, movement of the sleeve 85 will stop, but the shaft 101 will continue to move its full stroke, compressing the spring 110. The sleeve 85 will, of course, remain in the held position until such time as the motor 61 is energized. Upon energization of the motor 61 the sleeve 85 will be rotated, in one direction or the other and the faces of the teeth on the sleeve 85 will slip relative to the faces of the teeth on the clutch element 47. As soon as the teeth of the sleeve 85 clear the teeth of the element 47, the sleeve will move into engaged position under the influence of the stored energy in the spring 110. As previously described, as soon as the shaft 101 is moved, the lock mechanism 62 will be actuated to brake the flywheel 14 for preventing rotation of the spindle 10, thereby permitting the faces of the teeth 91 to slip relative to the faces of the teeth 56.

Energization of the motor 61 is effected at the time that the axial faces of the teeth 91 of the sleeve 85 are moved into the plane in which the axial faces of the teeth 56 are disposed. To this end, the normally open switch 64 is secured to the lever arm 136 in a manner so that its actuating lever 147 is disposed to be actuated by the end of a bolt 148 threadedly engaged in the end plate 72. The switch 64 is of the type wherein the actuating arm 147 has a predetermined amount of movement before it operates to close the contacts (not shown) within the switch and after actuating the contact (not shown) of the switch to a closed position has a predetermined amount of overtravel. It is preferred that energization of the motor 61 occur at the time that the axial faces of the teeth of the sleeve 85 are moved into the plane in which the axial faces of the teeth of the clutch element 47 are disposed. However, the motor 61 may be energized after the time that the teeth of the two clutch members would engage. This may be accomplished by simply adjusting the bolt 148 inwardly of the end plate 72 so that the bolt 148 will actuate the lever 147 of the switch 64 somewhat later than described.

The control box 65 for operating the power draw-in bar mechanism comprises a panel 150 which is disposed on the side and toward the front face of the column 11. Thus, the operator may insert the tool within the socket 21 of the spindle 10 with his right hand and utilize his left hand for actuating switch buttons 151 and 152 in the panel 150. As shown in FIG. 1, the control box 150 has two switch buttons 151 and 152. The switch button 151 is a two position interlocking switch which when turned to a leftwardly position, as viewed in FIG. 1, will connect the spindle motor (not shown) to a power source to effect energization of the spindle motor (not shown). The switch button 151, when in the leftward position, will also disconnect the power draw-in bar motor 61 from the power source. Thus, both motors can never be energized at the same time. The switch button 151 when turned to a rightward position will connect the power draw-in motor 61 to the power source and disconnect the spindle motor (not shown) from the power source. With the switch button 151 in the rightward position the switch button 152 may be turned either to a leftward position or a rightward position to initiate an operation of the power draw-in mechanism. The switch button 152 when held in the leftward position effects energization of the solenoid 63 and also establishes the direction of rotation of the motor 61 to effect rotation of the draw-in bar in a direction to threadedly engage the draw-in bar 33 with the tool 23. The switch button 152, when actuated to a rightward position, will also effect energization of the solenoid 63 but will produce rotation of the motor 61 in the opposite direction to thereby effect rotation of the draw-in bar 33 in the opposite direction to disengage the tool 23 from the spindle.

In the operation of the invention in a tool engaging operation, with the spindle 10 at rest, the various parts of the power draw-in bar mechanism as well as the draw-in bar 33 will be in the condition, as shown in FIGS. 1 and 2. In accomplishing a tool locking operation the operator will insert the tool holder 23 so that its tapered shank 22 is received in the spindle socket 21 with the end of the shank engaging the end of the draw-in bar 33, as clearly shown in FIG. 1. As the operator is inserting the tool 23 into the spindle socket 21 he will orient the tool so that the slots 26 in the collar 27 of the tool will be aligned to receive the keys 24 of the spindle. Thus, when the operator has properly inserted the tool holder 23 into the spindle socket 21, the end of the shank 22 will be in engagement with the end of the draw-in bar 33 and the keys 24 will be engaged in the slots 26 of the collar 27 of the tool.

While holding the tool 23 in position within the spindle socket with one hand, the operator, with his other hand, will turn the switch button 151 to the right thereby conditioning the power draw-in bar mechanism for operation. After actuating the switch button 151, the operator will then actuate the switch button 152 to the left and hold it in the leftward position. The switch button 152 in a leftward position will cause the solenoid 63 to be energized and will also establish the direction of rotation of the motor 61 to actuate the draw-in bar 33 in a direction to engage it with the tool 23. When the solenoid 63 is energized, the plunger 146 thereof will be moved outwardly or rightwardly, as viewed in FIG. 1, moving the sleeve actuating shaft 101 axially rightwardly. As the shaft 101 moves rightwardly it will cause the lever arm 136 to pivot about the pivot point 137. The stud 140 will act upon the end of the shaft 121 to move it axially rightwardly to engage the friction pad 124 against the flywheel 14 to lock the spindle 10 against rotation. As the clutch sleeve actuating shaft 101 continues its movement, the spring 110 will effect movement of the clutch sleeve 85 rightwardly. Assuming that the teeth of the sleeve 85 and the teeth of the clutch element 47 are in alignment, the sleeve will continue to move rightwardly until the axial faces of the two sets of teeth engage. When the two sets of teeth are in abutting engagement the sleeve 85 can no longer move axially and the spring 110 will be compressed, allowing the plunger 146 of the solenoid 63 to move its full stroke thereby moving the shaft 101 its full stroke.

Prior to the engagement of the teeth of the sleeve 85 and the clutch element 47, the lever 147 of the switch 64 will be actuated by the stud 148 due to the continued movement of the lever arm 136. Since the lever 147 has a predetermined amount of movement, as previously described, the lever arm will not actuate the open contacts (not shown) of the switch 64 to a closed position until the teeth of the sleeve 85 and clutch element 47 are in abutting relationship. At this time the lever arm 147 acts to close the switch 64 to effect energization of the motor 61. Since the direction of rotation of the motor has been established to effect rotation of the draw-in bar 33 in an engaging direction no other action on the part of the operator is necessary. As the motor 61 is energized, the sleeve 85 will be rotated to move the teeth 91 thereof out of alignment with the teeth 56 of the clutch element 47. When the teeth elements of the sleeve 85 clear the teeth of the clutch element 47, the stored energy in the spring 110 will force the sleeve 85 axially rightwardly into clutching position. At this time a drive connection is completed to the draw-in bar 33 and the draw-in bar will be rotated to threadedly engage its threaded end 32 into the threaded opening 31 of the tool 23.

Since the spindle is effectively locked to prevent it from rotating by the brake mechanism 62 and the tool holder 23 is interlocked with the spindle, the tool cannot rotate, therefore the threaded end 32 of the rotating draw-in bar 33 will rotate into full engagement with the threaded opening 31 of the tool holder. This action will tend to move the draw-in bar 33 axially rightwardly compressing the spring 36. The spring 36 upon being compressed will exert a force against the collar 35 of the draw-in bar 33 which force tends to resist the rightward movement of the draw-in bar 33, and the tool 23 will be drawn into the socket 21 of the spindle 10. When the shank 22 of the tool 23 is completely within the socket of the spindle, the draw-in bar will be moved rightwardly until the collar 35 engages the end of the sleeve 38, as shown in FIG. 3. At this time the tool 23 will be firmly seated and locked within the socket 21 of the spindle 10. Since the draw-in bar 33 is no longer free to rotate, and the driving connection between the motor 61 and the draw-in bar is still completed, the motor 61 will stall indicating to the operator that locking has been accomplished. The operator then merely releases the switch button 152 which is spring biased so that it will return to its neutral position.

With the switch button 152 released, the solenoid 63 will be de-energized and the compressed spring 114 will cause the shaft 101 to move leftwardly moving the plunger 146 inwardly into the solenoid and retracting the sleeve 85 by means of the retainer washer 104. As the shaft 101 moves leftwardly, the lever arm 136 will move with it to effect a return of the lever 147 of the switch 64 to its normal position thereby opening the switch to de-energize the motor 61. When the shaft 101 has returned to its normal leftward position, the force exerted by the stud 140 against the brake shaft 121 will be released and the shaft 121 will be moved leftwardly by the action of the spring 130 to disengage the friction pad 124 from the flywheel 14.

In a tool disengaging operation, the operator will actuate the switch button 151 rightwardly as previously described to condition the power draw-in mechanism for operation and will also revolve the switch button 152 in a rightward direction and retain it in this position to complete the operation. The rightward position of the switch button 152 will operate to effect energization of the solenoid 63 and also establish the direction of rotation of the motor 61 in the opposite direction to withdraw the threaded portion of the draw-in bar 33 from the thread of the tool holder 23. When the solenoid 63 is energized, the power draw-in mechanism will operate as described in the tool engaging operation. As the draw-in bar 33 is rotated to disengage it from the tool 23, the spring 39 being compressed, as shown in FIG. 3, will act to move the draw-in bar 33 leftwardly until the collar 35 thereof engages the thrust washer 41. At this time the tool 23 will be urged outwardly of the socket 21 until a complete separation between the draw-in bar 33 and the tool 23 has been effected. When the tool 23 is free, the operator will release the switch button 152 which will then snap back to its neutral position causing the solenoid 63 to be de-energized which will cause the motor 61 to be de-energized as previously described.

In the event that the connection between the draw-in bar and the tool is such that there is a tendency of the parts to bind, the switch button 152 may be momentarily released and then reactuated rightwardly again. This action will result in an impact blow being imparted to the clutch element 47 due to the spacing of the clutch teeth on both the sleeve 85 and the clutch element 47, which is such that there is a certain amount of lost motion between the clutch element 47 and the sleeve 85 before the teeth of the sleeve 85 and clutch element 47 meet in a driving engagement.

An electrical circuit for the apparatus is shown in FIG. 4. In a tool engaging action the two position selector button 151 will be actuated to the draw bar "DR" position. In this position a contact 170 is moved to a closed position to partially condition the electrical circuit to the solenoid 63. The selector button 151 when in the draw bar "DR" position also serves to move another contact 172 which is in an electrical circuit of the spindle motor starting circuit to an open codition. Thus, with the selector button 151 in the draw bar "DR" position the spindle motor cannot be energized by reason of the contact 172 being open. Likewise, when the selector button 151 is in the spindle "SP" position the solenoid 63 cannot be energized by reason of the contact 170 being open, thereby effectively preventing the draw bar motor 61 from being energized. With the selector button 151 in the draw bar "DR" position the switch button 152 may be turned from its normal neutral position to the draw bar "in" position and held in position. With the switch 152 held in the "in" position, a contract 173 associated therewith is moved to a closed position. Thereupon electrical current from an energized conductor 174 will flow to the solenoid 63 by means of a conductor 176, the closed contact 170, a conductor 177, the closed contact 173 and a conductor 178. The current will pass through the solenoid 63 energizing it and return to its source by means of a conductor 179 and a return conductor 180.

The solenoid 63, upon being energized, will operate to effect actuation of the clutch actuating shaft 101 and the lever 136, as previously described. The lever 136, upon moving, will move the brake mechanism 62 into braking engagement with the flywheel 14 and move the switch 64 so that the actuating lever 147 thereof engages the stud 148 thereby actuating the switch 64 to a closed position. With the switch 64 in a closed condition current from the current carrying conductor 174 will flow through a conductor 181, the closed contact 182 of the switch 64, and a conductor 183. From the conductor 183 current will continue on through a closed contact 184, associated with the switch 152 and actuated to the closed position in conjunction with the related contact 173. From the contact 184 current will flow through a conductor 186 to a draw bar motor forward starter 187 to energize the starter and thence return to its source by means of a conductor 188 and the return conductor 180. The draw bar motor starter 187, upon being energized, operates to close a normally open contact 187a in the draw bar motor circuit. Thus, current from the current carrying conductor 174 will flow through a conductor 190 through the now closed contact 187a of the motor starter 187 to the draw bar motor 61, energizing the motor for rotation in the forward direction. Current from the motor 61 will return to its source by means of a connected conductor 191 and the return conductor 180. Energization of the draw bar motor 61 will operate to effect engagement of the draw bar 32 with the tool or tool holder 23 to lock the tool holder with the spindle 10. When locking has been accomplished the switch 152 will be released allowing it to return to its neutral position, thereby opening the contacts 173 and 184 to effect de-energization of the solenoid 63 and the draw bar motor 61.

To release the tool holder 23 from the spindle 10 the selector button 151 will be rotated manually to the draw bar "DR" position and the switch 152 will be moved from its normal neutral position to the "out" position and held in that position. With the switch 152 in the "out" position another pair of contacts 193 and 194 associated therewith are moved to a closed position. Thus, current from the current carrying conductor 174 will flow through the conductor 176, the closed contact 170, the conductor 177 and a conductor 196 to the now closed contact 193.

From the contact 193 current will continue to flow through a conductor 197 to the conductor 178 and thence to the solenoid 63 to energize it. From the solenoid 63 current will return to its source by means of the conductors 179 and 180. The solenoid 63 upon being energized operates as previously described to actuate the shaft 101 and the lever 136. The lever 136, upon being moved, will operate to effect actuation of the switch 64 to close the contact 182 of the switch to permit current from the current carrying conductor 174 to flow through the conductor 181, the closed contact 182 of the switch 64, to the conductor 183. From the conductor 183 current will flow through a branch conductor 200 connected to the conductor 183 and by virtue of the now closed contact 194 associated with the switch 152 to a conductor 201. From the conductor 201 the current will continue on through a draw bar motor reverse starter 202, and return to its source by means of a conductor 203, the conductor 188 and the return conductor 180. Current to the motor reverse starter 202 will energize the starter thereby effecting a closing of a normally open contact 202a in the circuit to the draw bar motor 61. Current will now flow from the current carrying conductor 174 through the conductor 190 to a branch conductor 204. The current will continue on from the branch conductor 204 and pass through the now closed contact 202a of the motor reverse starter 202 to the draw bar motor 61 to effect energization of the motor 61 in the reverse direction. The current from the motor 61 will return to its source by means of conductor 206 and the return conductor 180. The motor 61, upon being energized in the reverse direction, will operate to disengage the draw bar 32 from the tool holder 23 releasing the tool holder from the spindle 10. Upon the release of the tool holder the switch 152 will be released permitting it to return to its neutral position, thereby opening the contacts 193 and 194 to effect de-energization of the solenoid 63 and the motor 61. It will be noted that the switch 152 when manually rotated to the "in" position will operate to close the contact 184 to the motor forward starter 187 and open the contact 194 in the motor reverse starter circuit and simultaneously close the contact 173 in the circuit of the solenoid 63. On the other hand, the switch 152 when manually rotated to the "out" position operates to open the contact 184 in the circuit of the motor forward starter, and close the contact 194 in the circuit of the motor reverse starter and also operates to close the contact 193 in the circuit of the solenoid 63. Thus, the solenoid 63 and the motor 61 will be energized through the single switch 152.

After a tool locking action has been accomplished and it is desired to operate the spindle 10, the selector switch button 151 is moved to the spindle "SP" position. In this position the switch button 151 serves to move the contact 172 to a closed position and move the contact 170 to an open position thereby conditioning the spindle motor start circuit for subsequent energization and also effectively prevents accidental energization of the solenoid 63 and the draw bar motor 61. The selector switch button 151 when moved to the spindle "SP" position permits current from the current carrying conductor 174 to flow through a conductor 208, through the now closed contact 172 of the selector switch to a conductor 209. A spindle start button 210 may now be actuated to connect the conductor 209 to a conductor 211 which in turn is connected to a spindle start relay 212 permitting the current to flow thereto. Current flowing to the relay 212 will condition an electrical circuit (not shown) to effect energization of the spindle motor (not shown) and also close a normally open contact 214 to establish a holding circuit permitting current to continue to flow to the relay 212 after the spindle start switch 210 has been released. Current from the relay 212 will return to its source by means of a conductor 216, the normally closed contact 217 of a spindle motor stop switch 218 and a conductor 219 connected to the return conductor 180. Operation of the spindle motor may be terminated by manually actuating the stop switch 218 to open its normally closed contact 217 and thereby break the circuit to the relay 212 to de-energize it.

From the foregoing detailed description of the illustrative structure set forth herein to disclose the principles of the present invention, it is apparent that there has been provided an improved power draw-in bar mechanism capable of automatically engaging and disengaging a tool with a spindle.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing description, we hereby claim as our invention:

1. In a power draw-in bar arrangement in combination with; a tool driving spindle having a prime mover connected to drive it and apparatus for engaging the tool with said spindle in a driving engagement, said apparatus including; a draw-in bar for threaded engagement with the tool to effect a driving engagement of the tool with the spindle; an electric motor; clutch means operably connected to selectively couple said electric motor and said draw-in bar in a driving connection; a solenoid operable when energized to actuate said clutch means to couple said electric motor to said draw-in bar; a switch operable when actuated to energize said electric motor for operation in one direction to drive said draw-in bar in a direction to engage said draw-in bar with the tool and thereby engage the tool in the spindle in a driving engagement; means connecting said switch with said clutch means to automatically actuate said motor when said clutch means is operated by said solenoid to engage said electric motor with said draw-in bar; and means operably connected to energize said solenoid.

2. In a power draw-in bar arrangement for engaging a tool with a tool receiving driving member, the combination of; a rotatable spindle having a tool receiving socket; a draw-in bar supported by said spindle and operative to seat and lock a tool in the socket of said spindle; an electric motor coupled to said draw-in bar and operable when energized to effect operation of said draw-in bar; holding means operable to prevent rotation of said spindle when actuated; a solenoid operably connected to said spindle holding means and operable to move said spindle holding means into a spindle holding position when energized; a switch operably connected to energize said electric motor when actuated, said switch being connected to be actuated by said solenoid after said solenoid has moved said spindle holding means into holding position; and a manually actuatable switch operably connected to effect energization of said solenoid when actuated.

3. In a power draw-in bar arrangement in combination with a hollow spindle having a tool receiving end and power means for driving the spindle; a draw-in bar supported in the spindle and having means operable by rotation of said draw-in bar to engage with a tool to draw the tool within the tool receiving end of the spindle; an electric motor; drive mechanism connected to said electric motor and connectable to said draw-in bar to rotate it; a brake mechanism engageable with the spindle to maintain the spindle stationary; electromagnetic means operable when energized to engage said brake mechanism with the spindle, said electromagnetic means also being operable to connect said drive mechanism with said draw-in bar after said brake mechanism has been engaged with the spindle; a switch operable when actuated to energize said electric motor, said switch being actuated by the operation of said electromagnetic means when said drive mechanism is being connected to said draw-in bar; and means connected to effect energization of said electromagnetic means.

4. In a draw-in bar arrangement, the combination of an independently driven spindle having a tool receiving socket; a draw-in bar supported by said spindle and operable to engage with a tool and seat and lock the tool in the socket of said spindle; an electric motor; a driving connection between said electric motor and said draw-in bar operable to effect operation of said draw-in bar upon rotation of said electric motor, said driving connection including a normally disengaged clutch; a clutch actuating means operative to effect engagement of said normally disengaged clutch when energized; and means operably connected to and directly actuated by said clutch to effect energization of said electric motor.

5. In a draw-in bar arrangement for a tool, the combination of; an independently driven spindle having means for receiving the tool in a driving connection; a draw-in bar operable to connect with the tool to couple the tool with said spindle in driving relationship; an electric motor operably connected to drive said draw-in bar to effect connection of said draw-in bar with the tool and to lock the tool to said spindle to thereby establish a drive connection between said spindle and the tool; a normally disengaged clutch operably connected to be driven by said electric motor and operable when actuated axially to effect a drive connection with said draw-in bar; means operable when actuated to effect energization of said electric motor; means to actuate said normally disengaged clutch axially into clutching engagement for completing the driving connection from said motor to said draw-in bar; and switch means operably connected to said clutch actuating means to actuate said motor energizing means upon axial movement of said clutch to effect rotation of said clutch and complete the driving connection from said motor to said draw-in bar.

6. In a power draw-in bar arrangement for engaging and locking a tool with a rotatable member having means for receiving the tool, the combination of; a draw-in bar supported by the spindle for rotational and axial movement relative to it, said draw-in bar having means operable to engage with the tool upon rotation of said draw-in bar; an electric motor for rotating said draw-in bar; coupling means operable when actuated to effect a driving connection between said electric motor and said draw-in bar; a brake for said spindle; a normally open switch operably connected to effect energization of said electric motor when actuated to a closed position; a solenoid operably connected when energized to effect operation of said brake to prevent rotation of said spindle and to actuate said coupling means, said solenoid being also operably connected to actuate said switch to a closed position after effecting the operation of said brake, and actuating said coupling means; and means operably connected to effect energization of said solenoid and to establish the direction of rotation of said motor in a direction to rotate said draw-in bar to effect an engagement of said draw-in bar with the tool and thereby engaging and locking the tool with the spindle.

7. In a power draw-in bar arrangement for engaging a tool with a tool receiving driving member, the combination of; a hollow rotatable spindle having a tool receiving socket; a draw-in bar supported in said spindle for rotation with it and for independent rotational and axial movement relative to said spindle, said draw-in bar having a threaded end to engage with a tool; resilient means connected to bias said draw-in bar in a disengaged position; an electric motor for rotating said draw-in bar in either direction relative to said spindle; a first member rotatably supported by said spindle and being operably connected for rotation with said draw-in bar while permitting axial movement of said draw-in bar relative to said first member; a second member supported in axial alignment with said first member and for axial movement relative to it to thereby permit said second member to be moved into engagement with said first member to effect a driving engagement therebetween, said second member being operably connected to be driven by said electric motor in any axial position; an axially movable actuating rod disposed in axial alignment with said second member and operably connected to move said second member into coupling engagement with said first member; resilient means operably connected to bias said actuating rod in a retracted position to normally hold said second member in a disengaged position; a solenoid operably connected when energized to move said actuating rod axially to thereby effect movement of said second member into engagement with said first member; a switch connected to said electric motor and operable when actuated to energize said motor, said switch being operably connected to be actuated by said solenoid when it is coupling said second member with said first member to thereby effect rotation of said second member as it is coupled to said first member; a manually actuatable switch operably connected when actuated to one position to effect energization of said solenoid and to establish the direction of rotation of said electric motor in one direction to thereby rotate said draw-in bar into threaded engagement with a tool inserted within the socket of said spindle to draw the tool into the socket, said manually actuatable switch being also operably connected when actuated to another position to effect energization of said solenoid and to establish the direction of rotation of said electric motor in the opposite direction to threadedly disengage the draw-in bar from the tool to release the tool from the socket of said spindle.

8. In a power draw-in bar arrangement, in combination with a hollow rotary spindle provided with a tool receiving end and power means for driving said spindle; a draw-in bar supported by said spindle for rotation with it and for independent rotational and axial movement relative to it, said draw-in bar having means for effecting an operable connection between a tool and said spindle upon rotation of said draw-in bar in one direction; a clutch element rotatably supported by said spindle and operably connected to rotate with said draw-in bar in either direction; a reversible electric motor; an axially movable clutch sleeve operably connected to be driven by said electric motor and operable when actuated to engage with said clutch element to establish a drive connection between said electric motor and said draw-in bar; an actuating member for said clutch sleeve operable between a retracted position and an extended position, said clutch sleeve actuating member being resiliently connected to said clutch sleeve to permit said actuating member to be moved to its completely extended position although interference may exist to prevent the full engagement of said clutch sleeve with said clutch element; a solenoid operably connected to effect movement of said clutch sleeve actuating member from the retracted position to its extended position when energized; a spindle lock operable when actuated to prevent rotation of said spindle; lever means operably connected to actuate said spindle lock, said lever means being operably connected to be actuated by said energized solenoid when said clutch sleeve has been actuated for engagement with said clutch element; a switch operable when actuated to effect energization of said electric motor, said switch being operably connected to be actuated by the operation of said lever means; a manually operable switch operably connected when actuated to one position to effect energization of said solenoid and to establish the rotational sense of direction of said electric motor in a direction to rotate said draw-in bar to effect a connection of said draw-in bar with the tool, said manually operable switch being operable when actuated to another position to effect energization of said solenoid and to establish the rotational sense of direction of said electric motor in the opposite direction to effect disengagemetn of said draw-in bar from the tool.

9. In a power draw-in assemblage for operatively connecting a tool with its driving member; a rotary spindle having a tool receiving socket; a draw-in bar carried by said spindle and being operable to drivingly connect a tool with the spindle socket; a motor coupled to said draw-in bar to move the latter along said spindle; a brake for holding said spindle against movement; a solenoid for actuating said brake; and means operable by said solenoid after the latter has actuated said brake for effecting operation of said motor.

10. In a power draw-in assemblage for operatively connecting a tool with its driving member; a rotary hollow spindle having a tool receiving socket; a draw-in bar confined within said spindle and being movable to drivingly connect a tool with said spindle socket; an electric motor operatively connected to said draw-in bar to move the latter; a brake for holding said spindle against rotation; a solenoid for actuating said brake; and a switch operable by said solenoid after the latter has actuated said brake for effecting actuation of said motor.

References Cited in the file of this patent

UNITED STATES PATENTS

| | | |
|---|---|---|
| 2,557,582 | Turrettini | June 19, 1951 |
| 2,667,820 | De Vlieg | Feb. 2, 1954 |
| 2,685,823 | Kaiser | Aug. 10, 1954 |
| 2,723,737 | Hammel et al. | Nov. 15, 1955 |
| 2,778,895 | Hebbel et al. | Jan. 22, 1957 |
| 2,924,152 | Zettler | Feb. 9, 1960 |